United States Patent [19]
Bruner

[11] 3,935,561
[45] Jan. 27, 1976

[54] SIGNAL LAMP CONFIGURATION FOR DIRECTING HIGH SPEED TRAFFIC AND SEQUENCING MEANS THEREFOR

[75] Inventor: William L. Bruner, London, Ky.

[73] Assignee: F. B. Electronics, London, Ky.

[22] Filed: July 9, 1974

[21] Appl. No.: 486,777

Related U.S. Application Data

[63] Continuation-in-part of Ser. No. 271,494, July 13, 1972, Pat. No. 3,883,846.

[52] U.S. Cl. .................. 340/109; 315/318; 340/82; 340/331

[51] Int. Cl.² .......................................... B60Q 7/00

[58] Field of Search ......... 340/109, 82, 25, 26, 167, 340/336 R, 331, 335; 315/314, 315, 316, 317, 318, 319, 320

[56] References Cited

UNITED STATES PATENTS

| | | | |
|---|---|---|---|
| 3,479,641 | 11/1969 | Summers | 340/109 |
| 3,622,980 | 11/1971 | Elledge | 340/109 |
| 3,747,063 | 7/1973 | Hudson | 340/109 |
| 3,778,676 | 12/1973 | Keller | 315/318 |

*Primary Examiner*—John W. Caldwell
*Assistant Examiner*—Donnie L. Crosland
*Attorney, Agent, or Firm*—Birch, Stewart, Kolasch and Birch

[57] ABSTRACT

A signal lamp configuration for directing high speed traffic and a solid state sequencer for selectively energizing the same are described. The signal lamp configuration includes a pair of arrows inclined in opposite directions and having intersecting tail portions. The arrows are sequentially energized by the solid state sequencer from tail to head to direct traffic around a hazardous condition on a roadway. The arrows may also be flashed ON and OFF simultaneously if desired.

2 Claims, 1 Drawing Figure

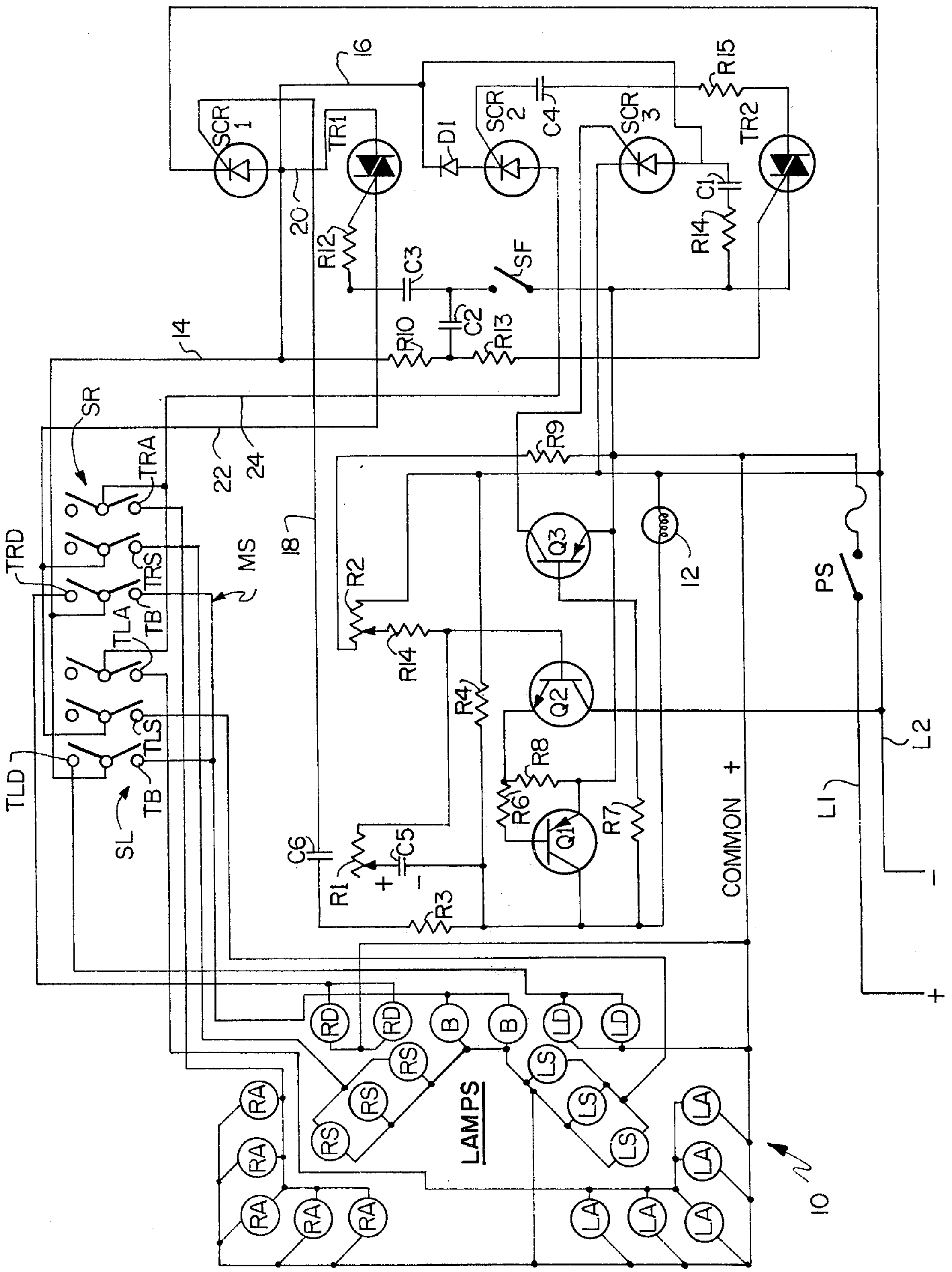
SCR 1
SCR 2
SCR 3
TR1
TR2
D1
C1
C2
C3
C4
C5
C6
R1
R2
R3
R4
R6
R7
R8
R9
R10
R12
R13
R14
R15
Q1
Q2
Q3
SF
PS
L1
L2
SR
SL
MS
TRA
TRS
TRD
TLA
TLS
TLD
TB
COMMON +
LAMPS
RA
RS
RD
B
LD
LS
LA
10
12
14
16
18
20
22
24

SIGNAL LAMP CONFIGURATION FOR DIRECTING HIGH SPEED TRAFFIC AND SEQUENCING MEANS THEREFOR

BACKGROUND OF THE INVENTION

This is a continuation-in-part of copending application Ser. No. 271,494 filed July 13, 1972 now U.S. Pat. No. 3883846 and assigned to the same assignee as the present invention.

FIELD OF INVENTION

The present invention relates to a signal lamp configuration and solid state sequencer therefor for directing high speed traffic around a hazardous condition on a roadway.

DESCRIPTION OF PRIOR ART

Signal lamp configurations known heretofore for directing high speed traffic either to the right or left of a hazardous condition include arrow means which point at right angles to the direction of the oncoming traffic. Therefore, signal arrows of this type tend to instruct a motorist that either a right or left, right angle turn, is required. This is misleading and can of course be quite startling to an oncoming motorist traveling at a high rate of speed. Arrow configurations of this type are disclosed in U.S. Pat. Nos. 1,580,118 to Cross; 3,479,641 to Summers; and 3,622,980 to Elledge.

SUMMARY OF INVENTION

Accordingly, it is an object of the present invention to provide a signal lamp configuration for directing high speed traffic which accurately indicates that a gradual rather than an abrupt change of lanes is necessary.

It is a further object of the present invention to provide a signal lamp configuration which will warn an oncoming motorist of forthcoming danger without startling the motorist.

The objects of the present invention are fulfilled by providing a signal lamp configuration consisting of two arrows inclined in opposite directions and having intersecting tail portions of the shanks thereof. The tail portions and shanks of the respective arrows define a curved path of signal lights which may be sequenced from the tail to the head of the arrow. This curved and inclined path of sequentially energized lights functions to instruct an oncoming motorist that a gradual change of lanes is desirable.

A solid state sequencer is provided for sequencing the pass right and/or the pass left arrow from tail to head.

The objects of the present invention and the attendant advantages thereof will become more readily apparent with reference to the following detailed description of the drawing.

Referring in detail to the drawing there is illustrated a traffic direction signal light configuration generally indicated 10. All of the signal lamps are connected to positive power line L1. The signal light configuration 10 may be mounted on a sign panel of the type generally described in copending application Ser. No. 271,494 filed July 13, 1972 of which this application is a continuation-in-part.

The pass left arrow includes groups of signal lamps defining a tail portion consisting of lamps RD, B; a shank portion consisting of lamps LS; and an arrowhead portion consisting of signal lamps LA.

The pass right arrow includes groups of signal lamps defining a tail portion consisting of signal lamps LD, B; a shank portion consisting of signal lamps RS; and an arrowhead portion consisting of signal lamps RA.

All signal lamps in a preferred embodiment are of the high intensity type having very narrow lateral and vertical beam spreads such as types which are well known in the traffic direction control art.

As illustrated in the drawing the tail portions of the pass left and pass right arrows cross or intersect each other and extend along the bottom of the sign panel. This feature coupled with the angle at which the respective shanks and arrowheads are disposed functions to instruct an oncoming motorist that a gradual rather than abrupt change of lanes is necessary.

The mode of energization of the signal lamp configuration 10 is controlled by mode selector switches generally designated MS and a solid state sequencing circuit to be more fully described hereinafter.

Mode selector switch MS includes two banks of switches, SL for selectively energizing the pass left arrow, and switch SR for selectively energizing the pass right arrow. Switch SL is provided with terminals TB, TLD, TLS, and TLA and corresponding switch arms for selectively connecting lamp groups B, LD, LS, and LA, respectively, in circuit with the power supply and the solid state sequencer as the switch arms are closed. In a like manner switch SR is provided with terminals TB, TRD, TRS, and TRA for selectively connecting lamp groups B, RD, RS, and RA, respectively, in circuit with the power supply and the solid state sequencer as the switch arms are closed. The exact mode of energization of the signal lamps will be more fully described hereinafter.

The solid state sequencer of the present invention consists of a D.C. power supply connected across lines L1, L2; a main power switch PS; a timing control oscillator; and a plurality of solid state switching devices connected in circuit with predetermined terminals of switches SL and SR. The switching cycle of the solid state switching devices is initiated and terminated by the timing control oscillator.

The timing control oscillator comprises transistors Q1, Q2, Q3; timing capacitor C5; and a plurality of resistors R1, R2, R3, R4, R6, R7, R8, and R14. Transistor Q1 and Q3 are rendered alternately conductive and control the initiation and termination of a sequencing cycle, respectively. The duration of the sequencing cycle is controlled in part by timing capacitor C5.

The transistors Q1, Q2, Q3 of the oscillator assume the following states of conduction as main power switch PS is closed; PNP transistor Q1 is immediately turned ON due to the positive potential on its emitter from line L1 and the negative potential on its collector applied from line L2 through resistor R4; NPN transistor Q2 is biased in an OFF condition due to an insufficient positive bias on its base; and PNP transistor Q3 is biased OFF due to a positive bias on its base applied from the collector of Q1 through resistor R7.

Also as power switch PS is closed indicator lamp 12 is energized and capacitor C5 begins to charge in the polarity shown from line L1 through resistors R9, R2, R14 and R1. When the charge on capacitor C5 reaches a predetermined value after a predetermined time regulated by the RC time constant of R9, R2, R14, R1 and C5, the base of NPN transistor Q2 becomes forward biased and transitor Q2 begins to conduct permitting capacitor C5 to discharge therethrough to negative line L2. The conductive or ON state of Q2 turns Q1 OFF. With Q1 OFF its base becomes negative and current begins to flow out of the base of transistor Q3 thus turning Q3 ON. The ON condition of transistor Q3 turns On SCR3 to terminate the sequencing cycle of the signal lamps in a manner to be described more fully hereinafter.

The solid state switching circuit of the present invention includes three silicon controlled rectifiers SCR1, SCR2, SCR3 and two triacs TR1, TR2. SCR1 when conducting completes a circuit through mode selector MS to facilitate the energization of a selected tail portion of the pass right or left arrows as selected. Triac TR1 when conducting completes a circuit through mode selector MS to facilitate the energization of a selected shank portion of the pass right or left arrows. SCR2 when conducting completes a circuit through mode selector switch MS to facilitate the energization of a selected arrowhead of the pass right or left arrows.

Silicon controlled rectifier SCR1 has its anode connected along line 14 to mode selector switch MS and along line 16 to the cathode of diode D1. The cathode of SCR1 is connected directly to the negative power line L2. The gate electrode of SCR1 is connected by line 18 through a commutating capacitor C6 and resistor R3 to collector of transistor Q1 in the timing control oscillator. Accordingly, when transistor Q1 is turned ON a positive pulse from the collector thereof is transmitted along line 18 to gate SCR1 ON and energize a selected tail portion of signal lamps i.e. lamps B, LD and/or B, RD. Thus as power switch PS is closed and transistor Q1 conducts the pass right and/or pass left arrows begin to sequence from tail to head.

Triac TR1 has one main terminal connected to the anode of SCR1 by line 20 and another main terminal connected through line 22 to mode selector switch MS. The gate terminal of TR1 is connected through an RC timing circuit, including resistor 12 and capacitor C3. As SCR1 is turned ON, capacitor C3 begins to charge. When the charge on capacitor C3 reaches a predetermined time, TRIAC TR1 will be turned on. Thus a selected group of signal lights LS or RS comprising the shanks of the pass right or left arrows will be energized a predetermined time following energization of the tail portions, the time delay being determined by the RC time constant of resistor R12 and capacitor C3.

Silicon controlled rectifier SCR2 has its cathode connected through diode D1 and line 16 to the anode of SCR1 and its anode connected via line 24 to mode selector switch MS. The gate electrode of SCR2 is connected to main terminal of triac TR2 through resistor R15 and commutating capacitor C4. Thus SCR2 is turned ON when triac TR2 is rendered conductive.

Triac TR2 has the other main terminal thereof coupled to one side of capacitors C2 and C3 and its gate electrode coupled to a second RC time-delay circuit comprising resistor R10 and capacitor C2. Capacitor C2 begins to charge when SCR1 is turned on and when it charges to a predetermined value triac TR2 is gated ON which renders SCR2 conductive to selectively energize signal lamps LA or RA comprising the heads of the respective arrows. The RC time constant for capacitor C2 is chosen to be longer than that of C3 so that the arrowhead portions of the signal lamps are sequenced on a predetermined period of time after the shank portions.

Thus the signal arrows are sequenced from tail to head as SCR1, TR1, and SCR2 are rendered conductive. For example, if the pass right arrow is selected by mode selector MS the pass right arrow will be energized as follows. First lamps B, LD will be energized as SCR1 is turned on. Then after a time delay determined by the time constant of R12, C3 lamps RS will be energized, as TR1 is triggered into conduction. Then after a second time delay determined by the time constant of R10, C2 lamps RA will be energized, thus completing the energization cycle of the pass right arrow. At this point all signal lamps of the pass right arrow will be energized.

Shortly after a complete sequencing cycle is effected transistor Q3 of the timing control oscillator will be turned on as described hereinbefore. Since the collector of Q3 is coupled to the gate electrode of SCR3, SCR3 will be turned ON at this time.

A resistor R14 and a capacitor C1 are coupled to the anode of SCR3. Capacitor C1 begins to charge as SCR1 becomes conductive at the beginning of a sequencing cycle. At the time when SCR3 is triggered into conduction capacitor C1 is fully charged tending to hold SCR1 ON. However, when SCR3 conducts capacitor C1 tends to clamp the anode of SCR1 to negative line L2 thus turning OFF SCR1, TR1, SCR2, and all signal lamps connected thereto. Accordingly, a pulse from transistor Q3 of the timing oscillator terminates the sequencing cycle and prepares the solid state switches including SCR1 for the next succeeding cycle of operation.

In one mode of operation mode selector MS is actuated to enable the sequencing of both arrows simultaneously. This type of signal can be very helpful in directing traffic around both sides of a hazardous condition. In this mode lamps LD and RD may or may not be energized as desired. For example, if it is not desired to energize lamps LD, RD the corresponding switch arms are not connected to terminals TLD, TRD.

Of course in the preferred mode of operation either the pass right or pass left arrow is sequenced in accordance with the switch positions of mode selector MS.

In all of the sequencing modes switch SF in circuit with capacitors C2, C3 remains closed.

In still another mode of operation, a simple flash mode, either the right or left arrows or both may be flashed ON and OFF simultaneously. In this mode switch SF is opened as shown to remove the time delay circuits including capacitors C2, C3 from the sequencing circuit. As a result triacs TR1, TR2 and SCR2 turn on simultaneously with SCR1 from a pulse at the collector of Q1 and turn OFF simultaneously as SCR3 is forward biased by a pulse from transistor Q3. Accordingly, all of the selected signal lights will flash ON and OFF simultaneously at a rate determined by copacitor C5 of the timing control oscillator.

For example, if it is desired to flash the lamp groups of the pass right arrow ON and OFF simultaneously in a simple flash mode, the switches to terminals TLD, TB, TRS, and TRA are all closed and switch SF is opened. This will cause lamp groups LD, B, RS, and RA to flash ON and OFF simultaneously.

The pass left arrow or both arrows can be flashed ON and OFF simultaneously by a proper selection of switches in mode selector MS in a like manner.

The sequencing circuit of the present invention may be modified as would occur to one of ordinary skill in the art without departing from the spirit and scope of the present invention.

I claim:

1. Circuit means for sequentially energizing a plurality of signal lights in an arrow configuration from the tail of said arrow toward the head thereof comprising:

timing oscillator means generating a first timing pulse for initiating a sequencing cycle and generating a second timing pulse for terminating said sequencing cycle;

a first silicon controlled rectifier means for energizing signal lamp means at the tail portion of the shank of said arrow in response to being triggered into conduction by said first timing pulse from said oscillator means;

a first triac means for energizing signal lamp means of the remaining portion of the shank as said triac is triggered into conduction a predetermined time after said first silicon controlled rectifier;

a second silicon controlled rectifier means for energizing signal lamp means defining the arrowhead of said arrow when said second silicon controlled rectifier is triggered into conduction a predetermined time after said first triac is rendered conductive; and a third silicon controlled rectifier means which is rendered conductive in response to said second timing pulse from said oscillator to thereby turn OFF said first silicon controlled rectifier, said first triac, and said second silicon controlled rectifier to deenergize all of the signal lamps and terminate the sequencing cycle.

2. The circuit means of claim 1 wherein there is further provided second triac means having a gate electrode coupled through a time delay circuit to the anode of said first silicon controlled rectifier and a main terminal coupled to the gate electrode of said second silicon controlled rectifier, whereby said triac triggers said second silicon controlled rectifier into conduction a predetermined time after said first silicon controlled rectifier is rendered conductive.

* * * * *